United States Patent [19]

Braun et al.

[11] Patent Number: 4,654,048

[45] Date of Patent: Mar. 31, 1987

[54] PROCESS FOR THE PREPARATION OF A POWDER SUITABLE FOR FRITTING

[75] Inventors: Camille Braun, St. Villard de Lans; Michel de Neve, Meylan, both of France

[73] Assignee: Commissariat a l'Energie Atomique, Paris, France

[21] Appl. No.: 758,675

[22] PCT Filed: Dec. 21, 1984

[86] PCT No.: PCT/FR84/00300

§ 371 Date: Jun. 26, 1985

§ 102(e) Date: Jun. 26, 1985

[87] PCT Pub. No.: WO85/03014

PCT Pub. Date: Jul. 18, 1985

[30] Foreign Application Priority Data

Dec. 29, 1983 [FR] France ................... 83 21022

[51] Int. Cl.$^4$ ............ B01J 2/08; C04B 35/10; C04B 35/49; C04B 35/52

[52] U.S. Cl. .................. 23/293 A; 501/88; 501/94; 501/103; 501/127

[58] Field of Search ........... 23/293 A; 501/90, 94, 501/103, 127, 88

[56] References Cited

U.S. PATENT DOCUMENTS

| | | | |
|---|---|---|---|
| Re. 31,447 | 11/1983 | Baney et al. | 501/88 |
| 2,984,576 | 5/1961 | Alexander et al. | 501/94 |
| 3,488,291 | 1/1970 | Hardy et al. | 501/88 |
| 3,793,041 | 2/1974 | Sanman | 501/103 |
| 3,937,797 | 2/1976 | Romanski et al. | 23/293 A |
| 3,986,978 | 10/1976 | Michalko | 252/317 |
| 4,098,874 | 4/1978 | Mitsche et al. | 423/628 |
| 4,320,074 | 3/1982 | Birchall et al. | 501/127 |
| 4,429,051 | 1/1984 | Davidge et al. | 501/94 |
| 4,543,341 | 9/1985 | Barringer et al. | 501/103 |

FOREIGN PATENT DOCUMENTS

| | | | |
|---|---|---|---|
| 0073120 | 2/1983 | European Pat. Off. | 23/293 A |
| 1326386 | 4/1963 | France | 501/127 |
| 1492326 | 1/1967 | France | 23/293 A |
| 1576728 | 1/1969 | France | 23/293 A |
| 2077367 | 10/1971 | France | 23/293 A |
| 56-74130 | 6/1981 | Japan | 23/293 A |

*Primary Examiner*—John Doll
*Assistant Examiner*—Robert Kunemund
*Attorney, Agent, or Firm*—Oblon, Fisher, Spivak, McClelland & Maier

[57] ABSTRACT

Process for the preparation of a powder suitable for fritting.

The process comprises the stages of forming an emulsion, fractionating the emulsion into microdroplet form, which are solidified, dried and heat treated. According to the invention, the emulsion is formed from at least one powder suspended in a solution of at least one precursor salt, i.e. whereof the cation or cations are constituent elements of the powder to be formed.

Application to the replacement of metal parts by ceramic parts in heat motors.

5 Claims, No Drawings

PROCESS FOR THE PREPARATION OF A POWDER SUITABLE FOR FRITTING

BACKGROUND OF THE INVENTION

The present invention relates to a process for the preparation of a powder in the form of grains, and which is particularly suitable for fritting, especially for producing large members having improved mechanical properties.

It is known to use alumina or alumina-based refractory materials e.g. in place of metal parts in mechanical assemblies operating at high temperatures, i.e. above 1000° C., which is the case in heat motors. By comparison with other refractory ceramics, alumina or alumina-based composite materials have the advantage of a good thermal shock resistance. Moreover, their bending resistance is improved on carrying out a zirconia microdispersion in a finely divided alumina. This resistance rises from 200 to 350 MPa, when the crystallites have a size not exceeding a few microns.

The alumina or alumina-based composite materials are shaped in a conventional manner in accordance with the following industrial procedure:

1. preliminary treatment of the powder;
2. compression of a rough blank;
3. thermal treatment and natural fritting;
4. obtaining the required dimensions.

It is vital to obtain a rough compressed blank as close as possible to the final dimensions, if it is wished to industrially produce dense parts of large size and complicated geometry. It is therefore the capacity to produce such rough parts, which controls the practicability of the complete process. However, at present, rough blanks do not have an adequate strength to enable anything other than small simple objects to be produced on an industrial scale. Such a situation is very prejudicial to substituting metal parts operating at high temperatures by alumina-based ceramics, particularly in the case of large, complicated parts, despite the excellent performance levels which can be expected from alumina.

These difficulties are mainly due to the fact that the microcrystallization necessary for bringing about the mechanical reinforcement of the part can only be obtained by fritting the compressed object at a temperature equal to or below 1500° C. This can only be obtained with agglomerated, extremely finely ground powders which, as a result of the grinding lack cohesion and are consequently unsuitable for agglomeration. The granulation of the powder by compression and crushing is not possible, as a result of the lack of intrinsic cohesion of granules.

SUMMARY OF THE INVENTION

The object of the present invention is to eliminate these disadvantages by a process making it possible to obtain a powder with a good cohesion so that it can be shaped without prejudicing its densification capacity.

More specifically, the present invention relates to a process for the preparation of a powder suitable for compression and fritting and which comprises the stages of forming an emulsion, breaking up the emulsion into the form of microdroplets which are solidified, dried and heat treated, wherein the emulsion is formed from at least one powder suspended in a solution of at least one precursor salt.

The term precursor salt is understood to mean any salt, whereof the cation or cations will form constituents of the final powder.

The process is applicable to powders of metal oxides, particularly alumina, zirconia, titanium dioxide and hafnium oxide, either considered singly or in mixed form.

The invention is particularly suitable for treating alumina powder with a specific surface equal to or greater than 5 m$^2$/g. According to the invention, the powder, particularly a metal oxide is suspended in a solution of a mineral salt, whose cation is a constituent element of said powder (precursor), e.g. an aluminium salt in the case of alumina. The mineral salt or salts forming the precursor may or may not be one of the constituents of the powder to be treated, e.g. alumina—aluminium salt, alumina—zirconium salt. This suspension is emulsified in an organic liquid and is then broken up or fractionated. The fractionation of the emulsion in the form of microdroplets can take place by any known process, such as pneumatic atomization, centrifuging, etc.

Preferably and according to a preferred embodiment, the fractionation takes place by means of a non-immersed, hollow, ultrasonic probe.

Immediately following the fractionation, the microdroplets produced are solidified by any known process (dehydration, mechanical precipitation, lyophilization, etc.).

The small spheres obtained after this last stage are then heat treated. The precursor salt can be chosen for its capacity to partly decompose at low temperature, i.e. at around 150° to 200° C. At this stage of the process, the precursor gives highly hydroxylated basic salts, which solidify or set the droplets in spherical form. Calcination carried out at a temperature between 700° and 800° C. converts the salts into oxide spheres.

The mineral salt used as the precursor must be able to decompose at a low temperature, whilst retaining the overall cohesion and, after calcination, must leave behind no anionic residue such as chlorine, sulphur or carbon, which could be prejudicial to densification. For the same reason, the precursor proportion must be minimum. Within the scope of the invention, the preferred precursors used are carboxylated salts of aluminium, zirconium, titanium, hafnium and in general terms any cation, whose oxide is used as a structural element of the powder to be formed. Acetate is the simplest to use, but good results are also obtained with oxalates and citrates.

DESCRIPTION OF PREFERRED EMBODIMENTS

The invention will be made more readily apparent from reading the following description which is given in a purely illustrative and non-limitative manner of a number of examples of producing the powder according to the process of the invention. First, a number of examples will be given in connection with the preparation of suspensions emulsified in a hydroorganic medium, more particularly in the case of alumina to which zirconia may have been added.

EXAMPLE 1

Preparation of an alumina powder without additive.

10 g of basic aluminium acetate Al$_2$O(CH$_3$CO)$_4$, 4H$_2$O are dispersed in 400 cc of soft water, to which has previously been added 10 cc of concentrated acetic acid and 10 g of tartaric acid. This is raised to a temperature of 80° C. during 2 hours and accompanied by magnetic stirring, in order to ensure the maximum solubility of the aluminium salt. This is followed by the addition of 125 g of α-alumina. A first dispersion of the alumina in the liquid takes place, followed by the addition of an equal quantity of kerosene. Violent stirring leads to a stable hydroorganic suspension.

EXAMPLE 2

Preparation of an alumina emulsion to which molybdenum has been added.

2 g of molybdenum oxide (MoO$_3$) are dissolved in a volume of liquid obtained by mixing 10 cc of acetic acid, 21 cc of concentrated ammonia and 30 cc of water. 30 g of alpha-alumina is then added. The suspension is then dispersed in an equal volume of kerosene, to which can be optionally be added a wetting agent for stabilizing the emulsion. For example, the latter can be the product marketed under the name "Span 60" by Koch Light Laboratories, which is added in a proportion of 1% in the presently described example. In this example, the molybdenum oxide quantity can be increased by a factor of 5, provided that the acetic acid and ammonia quantities are increased in the same ratio. The dispersion still takes place in an equal volume of kerosene, but, in this case, it is no longer necessary to add the wetting agent.

EXAMPLE 3

Preparation of a zirconia-stabilized alumina emulsion.

84.5 g of zirconium diacetate are dissolved in 500 cc of water and after dissolving, 168 g of α-alumina are added thereto. Emulsion then takes place in an equal volume of kerosene.

The preparation of zirconia-stabilized alumina can also take place with basic zirconium carbonate as the precursor. For example, 50 cc of concentrated acetic acid are sampled and diluted to 100 cc. 100 g of basic zirconium carbonate are added portionwise thereto. Heatimg takes place, accompanied by stirring, to a temperature close to 80° C. in order to obtain a clear solution. This is followed by the addition of 40 g of α-alumina and a further dispersion takes place. The suspension obtained is ready to be emulsified by an equal volume of kerosene.

EXAMPLE 4

Preparation of zirconia.

500 g of zirconium carbonate are dissolved in 250 cc of acetic acid. Dilution takes place to 400 cc and 200 g of zirconia are added in powder form. The latter is dispersed and emulsification takes place in an equal volume of kerosene in the presence of 2 cc of a wetting agent which, in this particular case, is "Span 85", marketed by Koch Light Laboratories.

EXAMPLE 5

Preparation of an aluminium titanate powder Al$_2$TiO$_5$.

93.2 g of double titanium and ammonium oxalate are dissolved in 380 cc of water and 51 g of γ-alumina are dispersed in this solution. Stirring takes place and heating occurs to a temperature of approximately 50° C., which gives a gelatinous compound Al$_2$O$_3$, xH$_2$O, which is allowed to settle for about one hour. This phase is then emulsified by 135 cc of kerosene, in the presence of approximately 0.4 cc of a wetting agent, which can e.g. be that marketed under the name "Triton ×405" by B.D.H. Chemicals Ltd., Poole, England. If it is wished to stabilize the aluminium titanate system with silica, it is necessary to add the necessary quantity of colloidal silica powder, before introducing the alumina powder.

EXAMPLE 6

Preparation of silicon carbide powder.

60 g of colloidal silica powder and 40 g of carbon black are dispersed in one liter of water. Heating takes place at about 50° C., and 100 cc of water, 5 cc of ammonia and 15 g of soluble starch are added. Optionally water is added until obtaining a viscous, gelatinous suspension. Cooling is allowed to take place, followed by emulsification in a kerosene volume equal to the volume of the aqueous phase in the presence of 1% of "Span 85". The grains of the suspension will subsequently be converted into silicon carbide during the heat treatment performed at a temperature above 1300° C. and in accordance with the reaction:

$$SiO_2 + 3C \rightarrow SiC + 2CO$$

Following the description of the preparation of the emulsion, a description will now be given of the second stage of the process according to the invention, consisting of breaking up or fractionating the emulsions obtained in the first stage, in order to obtain spherical grains. According to a preferred embodiment, the emulsions whose preparation has been described during the six above examples are atomized with the aid of an ultrasonic probe, having a hollow head, which is not immersed and which are immediately sprayed into kerosene kept at approximately 170° C., in order to ensure the desiccation thereof. The equipment used consists of a four liter round-bottomed flask, which is thermocontrolled and equipped with two refrigerators for condensing the evaporated aqueous phase, as well as a non-immersed, hollow ultrasonic head. Giratory stirring is maintained for the duration of the test. As the grains are spherical, they are suitable for outflow when intended for the automatic supply of shaping presses or for the supply of a plasma torch.

As a variant of said second stage, the emulsions produced in Examples 1 to 6 can be fractionated in the same way as hereinbefore (ultrasonic probe) and sprayed directly into a gaseous ammonia-saturated alcohol at ambient temperature, followed by setting by chemical precipitation.

The spheroids obtained by the aforementioned means are then treated (washing, rinsing, etc.) After drying, these spherical particles are calcined at a given temperature, in order to obtain the desired powders.

A description will now be given of further embodiments of the process according to the invention more particularly using the ILSE method (solid liquid inversion by emulsion formation).

EXAMPLE 7

Preparation of a spheroidized powder of Al$_2$O$_3$, to which has been added 15% by volume of ZrO$_2$ using the ILSE method.

1 liter of a zirconium acetate solution corresponding 302 g/l of ZrO$_2$ is sampled and 1068 g of α—Al$_2$O$_3$ of ceramic quality are added thereto and topping up takes place with 1.5 liters of soft water. Emulsification takes place in the presence of 6 cc of Triton ×100 (marketed by BDH) using 800 cc of heptane.

Precipitation of the hydroxide and passage to the solid state.

The suspension is passed at a flow rate of 1.5 to 3 l/h through a non-immersed ultrasonic probe into 3 l of methanol previously saturated with gaseous $NH_3$. The $NH_3$ flow rate is maintained at approximately 100 l/h during precipitation and orbital stirring of the medium is maintained throughout the test.

Recovery of the product by filtration on a fritted material:

Washing with methanol and then acetone take place. Drying takes place in a primary vacuum oven at a temperature equal to or below 200° C., or in a fluidized bed, or by propanol azeotropic entrainment. Finally, calcination takes place in air for one hour at 350° to 400° C. and then for one hour at 700° C.

EXAMPLE 8

Preparation of a $Al_2O_3$—$ZrO_2$ powder with addition of cerium.

Preparation of emulsion:

1 liter of zirconium acetate solution corresponding to $ZrO_2$=302 g/l is sampled, and 1142 g of $\alpha$—$Al_2O_3$ of ceramic quality and 115.8 g of ammoniacal cerium nitrate [$Ce(NO_3)_4 2ONH_4NO_3$] previously dissolved in 700 cc of water are added thereto. Emulsification takes place in the presence of 4 cc of Triton $\times 100$ using 800 cc of heptane and then the procedure of the previous example is repeated.

Cerium can also be added in the form of acetate without modifying the operating procedure. In addition, the dispersion of the emulsion in the methanol phase $NH_3$ can also take place using a nozzle (orifice 0.5 mm, approximate flow rate 12 l/h). A less spheroidized product is obtained which retains the other properties sought by the use of this process.

EXAMPLE 9

Preparation of a $ZrO_2$ powder, to which are added 2.5 molar % of $Y_2O_3$ using the ILSE method and starting with acetate salts.

50.7 g of yttrium acetate corresponding to 42.54% of $Y_2O_3$ are dissolved into 1.5 l of zirconium acetate solution corresponding to 302 g/l of $ZrO_2$. To this are added 4.5 cc of Triton $\times 100$ and emulsification takes place in the presence of 600 cc of heptane. This emulsion is sprayed by the non-immersed, ultrasonic probe in approximately 2 l of gaseous $NH_3$-saturated methanol and the product is recovered by filtration followed by washing operations as in Example 7.

Starting with nitrate salts:

1169.5 g of zirconium nitrate solution corresponding to 20.43% by weight of $ZrO_2$ and 151.85 g of yttrium nitrate corresponding to 29.5% by weight of $Y_2O_3$ are mixed. 3 cc of Triton $\times 100$ are added and emulsification takes place in the presence of 400 cc of heptane and said emulsion is sprayed via the non-immersed, ultrasonic probe into approximately 2 l of gaseous $NH_3$-saturated methanol, followed by the same procedure as in Example 7.

The products obtained can be dried in a stratified bed as in Example 7, in a fluidized bed using hot air, or by propanol azeotropic entrainment.

The calcination temperatures can be reduced for powders made from nitrates, if this is necessary. In addition, the agglomeration of small diameter spheroids ($<60$ $\mu m$) can be reduced, provided that screening takes place to mesh 250 $\mu m$ of the oxides dried at approximately 50° to 70° C. (product for plasma torch).

Thus, the process according to the invention offer particularly interesting advantages, because it makes it possible on the basis of a powder not very suitable for fritting or on the basis of compounds able to give said powder, to prepare grains having an excellent cohesion and which can therefore undergo without difficulty densification and fritting operations.

Compression tablets obtained from the emulsion of Example 3 could be densified to more than 95% of the theoretical density by natural fritting at a temperature not exceeding 1550° C., the fritted parts having a crystallite size of approximately 1 microns. It was also found that the bending resistance of these fritted parts was equal to or higher than 350 MPa.

Finally, it is obvious that the invention is not limited to the embodiments described and in fact applies to the production of numerous single or mixed oxides. Although certain examples relate to the preparation of mixed oxides with two constituents (yttriated zirconia or zirconia-stabilized alumina), the invention also applies to the formation of ternary compounds, such as:

$SiO_2$, $Al_2O_3$, MO, M being a divalent metal;
$Al_2O_3$, $Li_2O$, MgO, optionally seeded with $TiO_2$,
$SiO_2$, $B_2O_3$, $Na_2O$, or for the formation of quaternary compounds, such as ferromagnetic ceramics, e.g. NiO, ZnO, CuO, $Fe_2O_3$.

What is claimed is:

1. A process for preparing a metal oxide or metal carbide powder suitable for compression and fritting, comprising the steps of:
    (i) preparing an aqueous solution of a precursor salt, wherein a cation of said precursor salt is a constituent of said metal oxide or metal carbide powder suitable for compression and fritting;
    (ii) dispensing at least one precursor metal oxide or metal carbide powder in said aqueous solution;
    (iii) forming an emulsion with said aqueous solution and a liquid not miscibile with said aqueous solution;
    (iv) fractionating said emulsion, whereby micro droplets are obtained;
    (v) removing liquids from said micro droplets to obtain solid grains; and
    (vi) heating said solid grains.

2. The process according to claim 1, wherein said precursor metal oxide is a compound selected from the group consisting of alumina, zirconia, titanium dioxide and hafnium oxide.

3. The process according to claim 1, wherein said precursor metal oxide powder is alumina with a specific surface exceeding 5 $m^2/g$.

4. The process according to claim 1, wherein said precursor salt is an acetate, oxalate, or citrate.

5. The process of claim 1, further comprising dispersing carbon black during said dispersing step, and wherein said precursor metal oxide or metal carbide powder is silicon carbide and silica.

* * * * *